Dec. 31, 1957  P. E. FISCHER ET AL  2,817,935
FRUIT JUICE MACHINE
Filed March 2, 1951  4 Sheets-Sheet 1

INVENTORS
PAUL E. FISCHER
EDWARD J. COFFEY
BY William C. Babcock
ATTORNEY

Dec. 31, 1957   P. E. FISCHER ET AL   2,817,935
FRUIT JUICE MACHINE
Filed March 2, 1951   4 Sheets-Sheet 2
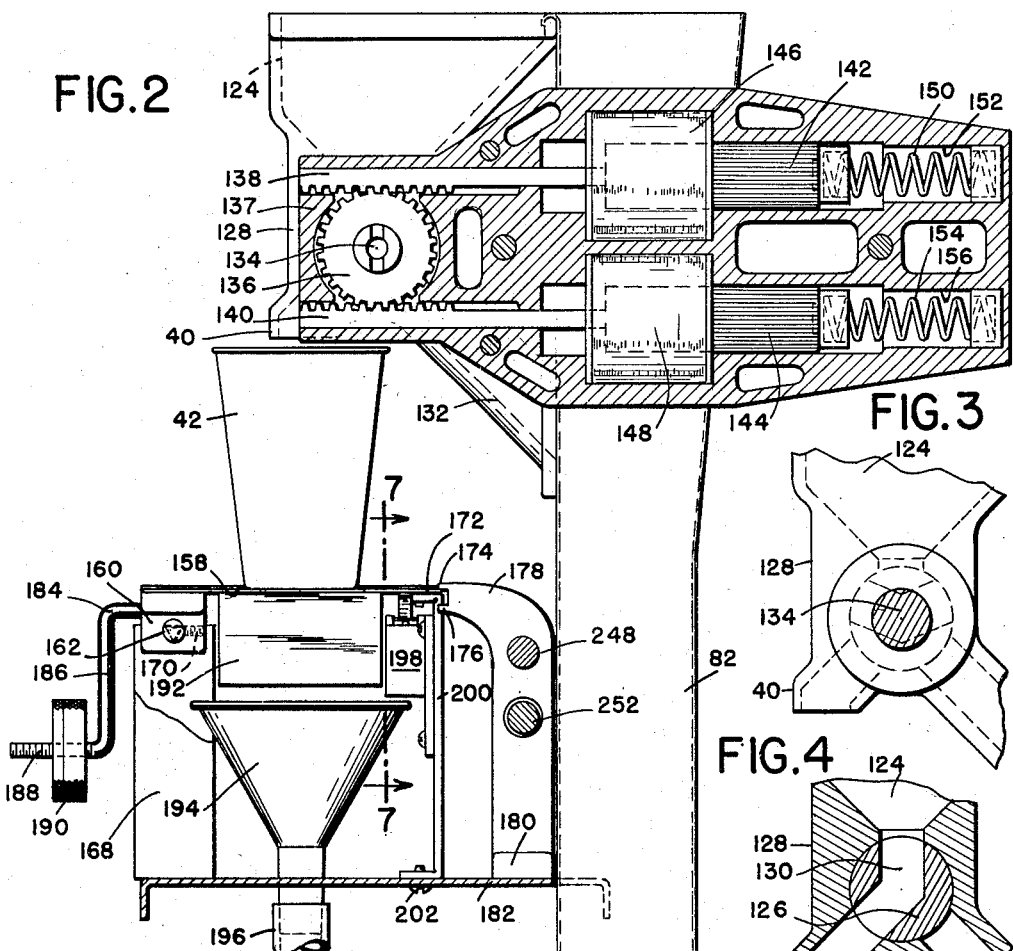
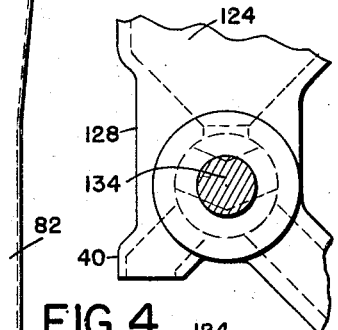
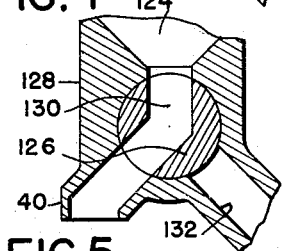
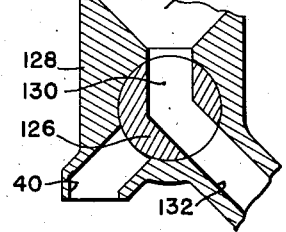
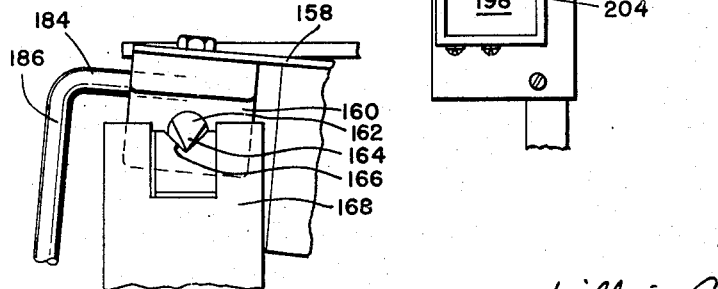
INVENTORS
PAUL E. FISCHER
EDWARD J. COFFEY
BY William C. Babcock
ATTORNEY

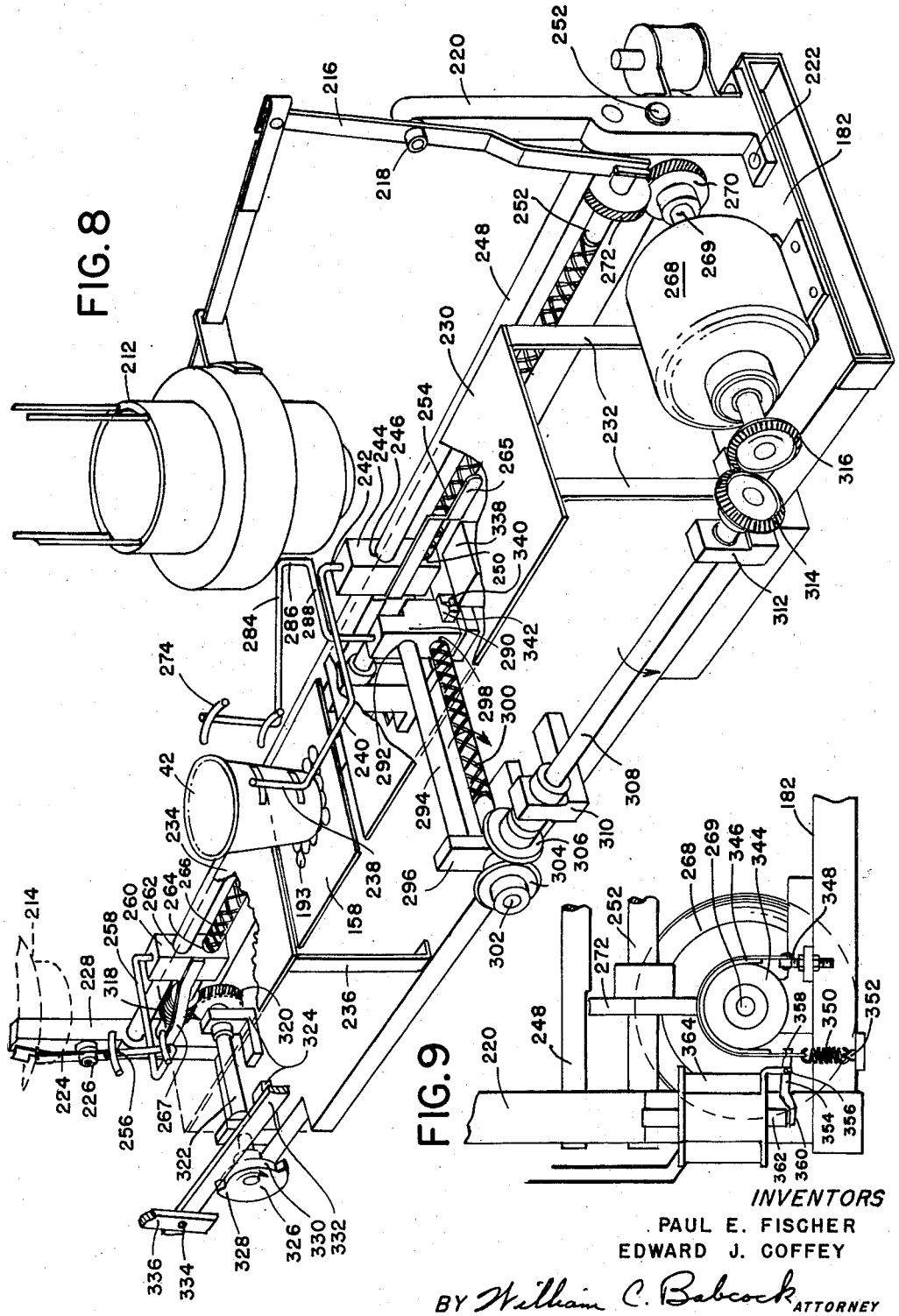

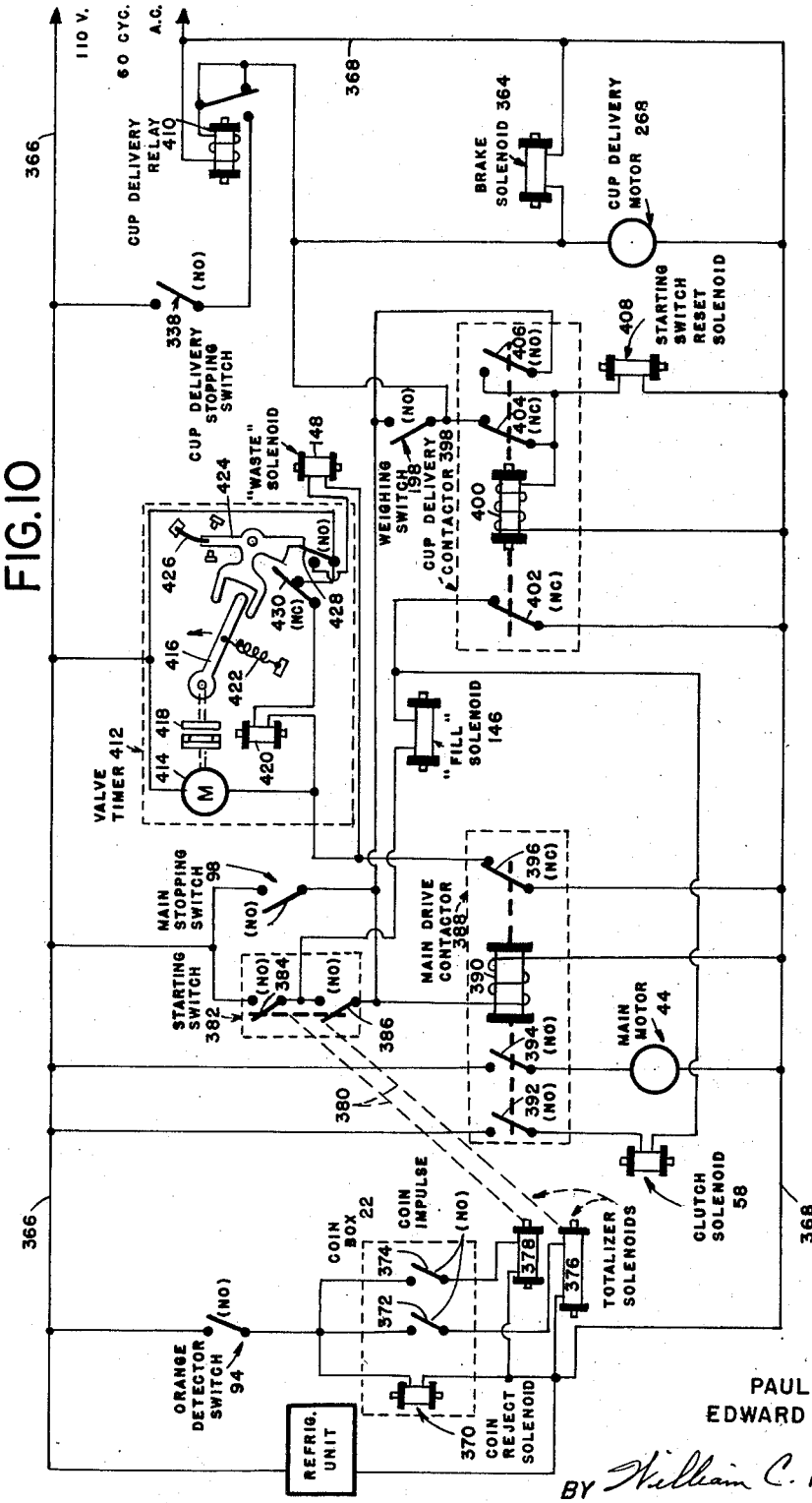

United States Patent Office 2,817,935
Patented Dec. 31, 1957

2,817,935
FRUIT JUICE MACHINE

Paul E. Fischer and Edward J. Coffey, Minneapolis, Minn., assignors to General Mills, Inc., a corporation of Delaware Application March 2, 1951, Serial No. 213,574

32 Claims. (Cl. 53—123)

The present invention relates to fruit juice machines and more particularly to a machine which extracts juice from whole fruit specimens and delivers the extracted juice to the user of the machine. Such machines are particularly adapted for use as coin operated fruit juice vending machines in which the operator can observe the extraction of juice from the whole fruit and know that fresh juice is being dispensed by the device.

Fruit juice machines of this general type are already known. One such machine is described and claimed in Monroe Patent 2,365,832. The improvements of the present invention will be described in connection with a machine of the Monroe type, although it will be apparent from the description and claims that the invention is not necessarily limited to the specific machine of the Monroe patent.

Prior machines in this field, such as the above Monroe device, have been operated through a single cycle in which a fruit specimen was delivered from a supply hopper to a reamer or other extraction unit, and in which the juice extracted from the specimen was then discharged into a receptacle which could be removed by the user. Because of variations in the size and juice content of individual oranges or other fruit specimens in the supply, the quantity of juice delivered to the user of the machine was subject to considerable variation.

Since the machines were designed for coin operation as fruit juice vending machines there was a possibility of dissatisfaction on the part of some customers whenever the quantity dispensed was less than that received by other customers.

There has accordingly been some commercial preference in the past for machines in which concentrated juice or previously extracted juice is stored in a reservoir and is dispensed in predetermined quantities to each successive customer. Machines of this reservoir or storage type, however, are subject to two major disadvantages. In the first place, the customer can not observe the extraction process and has no knowledge of the length of time the juice has been in storage. Secondly, it is well known that fruit juices oxidize and lose flavor when exposed to air for even a short length of time. Therefore reservoir type machines must either include expensive and complicated sealing and vacuum devices or suffer from deterioration of the product through exposure over long periods of inactivity.

With these problems of the prior art in view, it is accordingly one object of the present invention to provide an improved machine for the extraction of juice from whole fruit specimens.

It is a further object to provide such a machine in which a predetermined quantity of juice will be dispensed to each customer.

Another object is the provision of a machine in which the extraction of juice from a whole fruit specimen will be repeated until the predetermined quantity of juice is obtained.

Still another object is the provision of a machine having a reservoir in which any excess juice from a given fruit specimen may be retained after the predetermined quantity is dispensed.

A still further object is the provision of such a machine with time control means which will dump the juice from the reservoir to a waste outlet in case the machine is not started by another customer within a predetermined time interval following the preceding extraction.

Another object is a fruit juice machine having cyclically operable extraction means in combination with control means responsive to the quantity of juice discharged, including means for repetition of the extraction cycle until the control means responds to a predetermined juice quantity.

A further object is the provision of such a machine with cup transfer and delivery mechanism operable through a separate cup delivery cycle, in combination with control means for initiating the cup delivery cycle upon discharge of a predetermined quantity of juice.

Another object is a machine of this type in which response of a control means to a predetermined juice quantity will initiate a cup delivery cycle and in which the juice extraction cycle will be repeated until such cup delivery cycle is initiated.

A further object is the provision of improved means for refrigeration of the juice extraction mechanism and associated parts.

Still another object is the provision of improved control means for operation of the various machine parts in the desired sequence.

Other objects and advantages will be apparent from the following specification in which certain preferred embodiments of the invention are described with particular reference to the accompanying drawings. In these drawings, Figure 1 is a side view of a fruit juice machine according to the invention, with certain portions broken away and certain portions shown in section.

Fig. 2 is an enlarged side view of the juice reservoir, valve mechanism, and juice responsive control means according to the invention, with certain parts shown in section.

Fig. 3 is a partial side view showing details of the valve mechanism, with the valve in closed position.

Fig. 4 is a partial sectional view of the valve mechanism in discharge or filling position.

Fig. 5 is a view similar to Fig. 4 showing the valve in waste position.

Fig. 6 is an enlarged partial view showing details of the supporting means for the cup platform.

Fig. 7 is a partial view showing details of the weight control switch, taken along the line 7—7 of Fig. 2.

Fig. 8 is an enlarged partial perspective view showing details of the cup transfer and delivery mechanism.

Fig. 9 is a partial rear view showing details of the cup delivery brake mechanism, and Fig. 10 is a schematic circuit diagram showing details of the control circuits for the machine.

General description of operation

Figure 1:
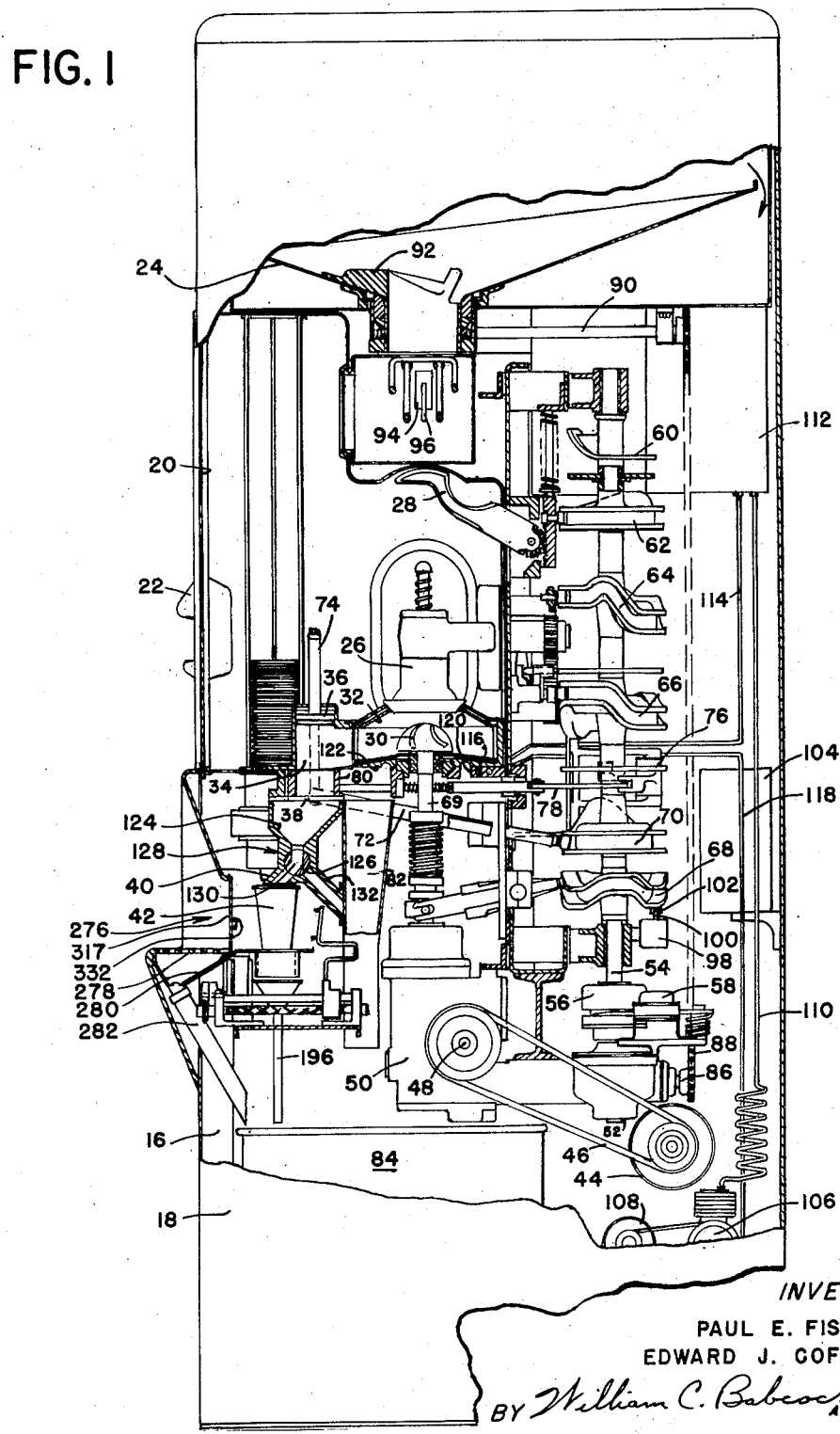

A machine according to the present invention includes a supply hopper for storage of whole fruit specimens and cyclically operable extraction means for receiving a predetermined number of such specimens from the supply hopper and extracting the juice from such specimens in each extraction cycle. The extracted juice is delivered to a discharge spout from which it may be fed into a suitable empty receptacle. Provision is made for repetition of the extraction cycle until a predetermined quantity of juice has been discharged.

Since a difficult sanitation problem would be encountered if the machine were stopped in the midst of an extraction cycle, the main driving means for the extraction mechanism is controlled by a main stopping switch which will terminate operation of the extraction means only at the end of a given extraction cycle. This main stopping means will not be effective until the predetermined quantity of juice has been discharged.

Because the desired quantity may be reached in the midst of an extraction cycle, a juice collecting reservoir and valve mechanism are located between the extraction unit and the discharge spout. The valve mechanism is controlled in response to the quantity of juice discharged and is movable between a filling or discharge position in which it provides a passage from the reservoir to the spout, and a closed position in which further juice from the extraction means is retained in the reservoir. The valve means is actuated in response to discharge of a predetermined quantity of juice and moves from discharged to closed position when the desired quantity is dispensed.

If the machine is again operated within a reasonable predetermined period of time, the excess juice remaining in the reservoir will be discharged into the next empty receptacle by movement of the valve means from closed to discharge position. However, in case the machine is not operated within such time as the extracted juice would remain fresh and tasty, the reservoir is provided with a waste outlet and with valve means having a waste position in which a passage is provided from the reservoir to the waste outlet.

The machine accordingly includes valve timing or time delay mechanism operating the valve means to waste position at the end of a predetermined time interval after completion of an extraction cycle. The timing mechanism is so arranged that it will be disabled or inoperative in case the machine is again operated within the predetermined interval.

The machine includes an empty cup supply, cup transfer means for moving a cup from the supply to a position beneath the discharge spout, and cup delivery means for movement of a filled cup from the discharge spout to the outside of the machine. The cup delivery and cup transfer means are operated through a cup delivery cycle in which a filled cup is first pushed away from the discharge spout, and another empty cup is then moved into position. Auxiliary driving means for the cup delivery and transfer mechanism is provided and this auxiliary driving means is actuated to initiate a cup delivery cycle in response to the discharge of a predetermined quantity of juice through the discharge spout. The mechanism includes cup delivery stopping means terminating the operation of this auxiliary driving means at the end of one cup delivery cycle.

From the foregoing general description, it will be apparent that the extraction means may be operated through one or two or more complete cycles, depending on the quantity of juice contained by each individual orange and depending on the quantity of juice for which the control means is set to respond, before a cup delivery cycle will be initiated. A detailed description of the various cycles and of the operating parts and control means for such cycles is given below.

*Extraction cycle and main driving means*

The extraction cycle of the machine will be described with primary reference to Fig. 1 in which the various essential parts of the extraction mechanism are shown. No attempt will be made to describe in detail the operation of the individual gears and cams, since such details may be readily ascertained from the above-mentioned Monroe patent and from the co-pending application mentioned below.

In general, the machine includes a main frame 16 and a suitable outer housing 18 which encloses the working parts. The front wall of the machine includes a transparent panel 20 through which the operator of the machine can observe the juice extraction process and be assured that he is receiving fresh juice from the machine.

A suitable coin box 22 is conveniently located for insertion of one or more coins by the operator to initiate the extraction cycle. Since the coin box is a standard commercial item and forms no part of the present invention, it will not be described further, except in connection with certain of its circuit details as shown in Fig. 10.

At the top of the machine is a supply hopper 24 designed to contain a sufficient number of whole fruit specimens to permit normal operation of the machine for the desired period without servicing. From the supply hopper 24, fruit specimens are fed in predetermined number, in this case one at a time, to the extraction mechanism.

The machine includes a pair of fruit gripping hands, one of which, 26, is shown in Fig. 1. One of these hands receives the fruit from the supply hopper 24 and carries it to the other hand in the manner described in the Monroe patent. Knife 28 is then operated and the hands successively carry their respective fruit halves to the reamer 30. The reamer 30 and its associated impeller housing 32 ream the juice and pulp from the respective fruit halves and discharge them centrifugally into the juice extraction chamber 34. A plunger 36 then squeezes the pulp against a strainer or screen 38 at the end of the extraction cycle to remove all possible juice from the pulp. The extracted juice then flows through a discharge spout 40 into a suitable empty receptacle such as the cup 42.

The main driving means for this extraction cycle includes a main driving motor 44 operatively connected by a belt 46 to the driving shaft 48 of a gear and transfer casing 50. Suitable connections within the case drive a vertical shaft 52 at the rear of the machine. Shaft 52 in turn is operatively connected to a main drive cam shaft 54 by means of a one-revolution clutch indicated at 56. Such a one-revolution clutch is a standard commercial item and will not be described in detail. This clutch is under the control of a main clutch solenoid 58. When the solenoid 58 is energized, a stop in the clutch mechanism is retracted so that cam shaft 54 will be operatively driven by shaft 52 for one complete revolution. At the end of that revolution, the clutch 56 will be disengaged, provided the solenoid 58 has been deenergized. If, however, solenoid 58 is still energized, then clutch 56 will continue in driving engagement and main cam shaft 54 will be driven through another revolution.

Main cam shaft 54 includes a plurality of cams for driving the various parts of the extraction mechanism through a single complete cycle for each revolution of the cam shaft, as described in the Monroe patent. Thus cam 60 at the upper end of the shaft controls the delivery of fruit specimens from the supply hopper 24 through movable stop plates (not shown). Cam 62 controls the operation of knife 28 to slice the fruit prior to the reaming operation.

Cams 64 and 66 control the position of the two fruit holding members, such as 26, and move said members from fruit receiving to fruit cutting, fruit reaming and ejection positions in the manner and in the sequence described in the Monroe patent.

Cam 68 controls the position of reamer 30 and reamer shaft 69. The reamer is raised and the reamer shaft 69 is driven at slow speed by a clutch connection from the transfer case 50, when either fruit holding cup positions a half section of fruit above the reamer. At the completion of the reaming, cam 68 controls the lowering of the reamer shaft 69 and reamer 30 and, through the intervening clutch connection of the Monroe patent, rotates the reamer 30 and impeller housing 32 at relatively higher speed to remove the juice and pulp from said members by centrifugal action.

The machine of Fig. 1 includes a further cam 70 which is not shown in the Monroe patent and which controls the action of juice extraction plunger 36 through intermediate levers 72 and 74. Another additional cam 76, by means of intervening levers such as 78, reciprocates the section 80 of the juice extraction chamber 34 so that after plunger 36 has pressed the juice from the pulp, section 80 will move into alignment with a waste chute 82. The pulp will then drop through the chute into a waste collection receptacle 84.

This juice extraction plunger 36 and details of its operation in synchronism with the operation of pulp removal section 80 are fully shown and described in the copending application of the present applicants, Serial No. 202,325, filed December 22, 1950, now Patent No. 2,642,106, for Fruit Juice Extraction Mechanism, and assigned to the same assignee as the present invention.

The transfer case 50 of the main driving means also includes a rearwardly projecting shaft 86, which operates a hopper agitating shaft 90 by suitable sprocket and chain connections 88. Rotation of shaft 90 causes rotation of a hopper agitator 92 around a vertical axis as described in said Monroe patent.

In order to prevent operation of the machine and acceptance of coins by the coin box 22 when there is an inadequate supply of oranges in the supply hopper 24, an orange detector switch 94 is suitably located to respond to the presence or absence of the necessary minimum quantity of fruit specimens. Switch 94 is provided with an actuating arm 96 which projects into the path of the fruit and closes switch 94 only if the desired minimum quantity is present.

A main stopping switch 98 is mounted on the frame member adjacent the main cam shaft 54 and is provided with an operating portion 100 engaged by a cam 102 which may conveniently be associated with the reamer control cam 68. The main stopping switch, as described in the Monroe patent, is opened by cam 102 at the completion of each cycle but remains closed throughout the intervening portions of the extraction cycle in order to prevent stoppage of the machine prior to completion of a given cycle.

The control box 104 is mounted at a readily accessible point in the rear of the machine and contains the valve timer, starting switch, contactors and other control devices described in detail in connection with Fig. 10 below.

As already indicated, the extraction means and main driving means are so arranged that for each complete extraction cycle, a predetermined number of fruit specimens (in this case one) will be fed from the supply hopper, sliced, reamed, and squeezed. The main drive cam shaft 54 controls the various parts to provide one complete extraction cycle for each revolution of the cam shaft.

Refrigeration unit

In order that the juice extracted by the machine may be cold and the fruit supply may be more readily preserved, a suitable refrigeration unit is incorporated in the device. This refrigeration unit may include a compressor 106 driven by a refrigerator motor 108. The compressor is connected by a pipe 110 to suitable coils indicated generally at 112 located adjacent the supply hopper. Circulation of air within the machine casing 18 will cool the supply hopper as well as the various machine parts within the casing. This general arrangement of a refrigeration unit within the machine is described in the Monroe patent in combination with a suitable controlling thermostat.

According to the present invention the compressor 106 and coils 112 are also connected by pipes 114 and 118 (which may constitute the return pipes to the compressor from the coil 112) with suitable channels 116 located in the metallic supporting base 120 of the reamer and impeller housing.

The rotating impeller 32 and its associated housing 122 are preferably removable from the supporting block 120 as a unit, for convenience in servicing and cleaning the machine. The provision of refrigerating passages 116 in the fixed supporting block 120 thus provides for additional cooling of the impeller housing and associated parts and insures that the juice extracted by the reamer will be supplied at the desired cold temperature. At the same time, the particular location and arrangement of the refrigerating passages 116 makes it possible to provide this cooling effect by conduction without interfering with the removal of the impeller housing for cleaning.

Juice reservoir and valve mechanism

As pointed out above, previous fruit juice machines which operate with whole fruit specimens have necessarily dispensed to the user the total amount of juice obtained from a given predetermined number of oranges. The quantity dispensed therefore varied with the juice content of the individual fruit specimens and such variations gave rise to consumer dissatisfaction.

According to one important feature of the present invention, a juice reservoir 124 is provided between the extraction means (such as reamer 30 and impeller housing 32) and the discharge spout 40. As shown in Fig. 1, the juice collecting reservoir 124 is located below the strainer 38 so that it will receive juice by gravity flow, as the juice and pulp are fed from the reamer to chamber 34 and are squeezed by plunger 36. Also, according to the invention, valve means are provided between the reservoir 124 and the discharge spout 40. As one example of such valve means a rotary valve member 126 is shown in Figs. 1–5, this valve member being supported for rotation in a valve housing 128 at the base of reservoir 124. The valve member 126 is provided with a passage 130 which, in one position of the valve, provides a juice passage between the reservoir 124 and the discharge spout 40. This position of the valve is referred to herein as the discharge or filling position of the valve. The parts are shown in this discharge position in Figs. 1 and 4.

Another important feature of the invention is the provision of a waste outlet 132 at the bottom of reservoir 124, in combination with valve means controlling the passage of juice from the reservoir to the waste outlet. While a separate valve member could be provided to perform this function, we prefer to form the passage 130 in valve member 126 with two angular branches so that the same valve can provide a waste position. Thus the valve can be rotated to the waste position shown in Fig. 5, in which a passage is provided for the flow of juice from reservoir 124 to the waste outlet 132. From the waste outlet, the juice passes through the waste chute 82 and into the waste receptacle 84.

When the valve means controlling the flow of juice from the reservoir to the discharge spout and to the waste receptacle are combined in a single member, such as member 126, this valve member and its passage 130 are so mounted and oriented that the valve will also have a closed position in which all remaining juice will be retained in reservoir 124 and no juice will pass either to the discharge spout 40 or the waste chute 132. This closed position of the valve is illustrated in Figs. 2 and 3.

The valve member itself is provided with an operating shaft 134 (Fig. 3) for rotation of the valve to any of its three positions. The actuating means for such rotation includes a gear member 136 keyed to shaft 134, and a pair of rack members 138 and 140. These rack members engage diametrically opposite portions of the gear and reciprocate in opposite directions along substantially parallel paths. The actuating gear 136 and racks 138 and 140 are mounted in a supporting housing 137 adjacent the reservoir and valve member.

Connected to the respective racks 138 and 140 are solenoid cores 142 and 144. Core 142 is associated with a solenoid coil 146 as shown in Fig. 2, while core 144 is operatively associated with another solenoid coil 148. A spring 150 is located in a recess 152 at the end of the valve actuating mechanism housing and engages the end of core 142 to urge it from right to left in Fig. 2.

A similar spring 154 mounted in a recess 156 in the housing engages the right end of core 144 and urges this core to the left in the figure. Since the respective solenoid cores and racks are interconnected by their common engagement with gear 136, and since springs 150 and 154 are substantially equal in size and strength, the springs will normally balance each other and hold the racks 138 and 140, gear 136, and valve member 126 in the position of Figs. 2 and 3 when neither solenoid is energized. This is the closed position discussed above.

Since cores 142 and 144 are not centered within the solenoid coils 146 and 148, but are displaced to the right thereof in the figure, energization of either solenoid will tend to move its respective core into the coil and thus move the associated rack to the left in the drawing. For example, if coil 146 is energized, its core 142 and rack 138 will be moved to the left. The additional force of the solenoid coil on its core will overbalance the resistance of spring 154 engaging the other rack 140 and its core 144, so that the latter will shift to the right in the drawing and gear 136 and valve member 126 will be rotated from the closed position of Fig. 3 to the discharge or filling position of Fig. 4. When solenoid 146 is de-energized, spring 154, because of its compression, will force the core 144 and rack 140 back to the left until the two springs balance each other and the valve is restored to closed position.

Similarly, when solenoid 148 is energized, its core and associated rack 140 will be moved to the left and the spring 150 of the remaining rack and core will be compressed as rack 138 moves to the right. Energization of coil 148 thus moves the valve from the closed position of Fig. 3 to the waste position of Fig. 5. Deenergization of solenoid 148 permits the spring 150 to expand until the springs balance each other and the valve is restored to closed position.

The circuit connections and other details by which the discharge or fill solenoid 146 and the waste solenoid 148 are energized will be described in greater detail below, particularly in connection with the circuit diagram of Fig. 10.

*Juice responsive control means*

According to the present invention the above described valve means is controlled by means responsive to the discharge of a predetermined quantity of juice through discharge spout 40. The form of control means illustrated herein is responsive to the weight of the discharged juice. It will be apparent, however, that other responsive means, such as a measuring chamber responsive to a predetermined volume, might be used. A weight-responsive control is preferred in the present instance because of its relative simplicity of construction and ease of adjustment.

The present control means includes a platform 158 for the support of the receptacle 42 to be filled. The platform 158 is provided at one edge (in this case, the forward edge) with depending brackets 160 in which bearing members 162 are mounted. Bearing members 162 have downwardly facing knife edges 164 which are pivotally supported in a V-shaped notch 166 of a bearing member carried on supporting brackets 168. The line of engagement between the knife edge 164 and the bottom of notch 166 serves as the pivotal axis for limited rotation of the cup supporting plate 158. A set screw 170 (Fig. 2) permits rotary adjustment of the knife edge 164 with respect to platform 158.

At the opposite or rear edge 172 of supporting plate 158, stop means are provided for limiting the extent of movement of the supporting plate around knife edge 164. Upper and lower stops 174 and 176, respectively, are provided on a member 178 secured at 180 to the bottom plate or supporting frame 182 of the cup transfer and delivery mechanism. The edge 172 of plate 158 is accordingly free to move vertically to an extent determined by the stops 174 and 176.

Projecting from the front of the supporting plate 158 is a rod 184 having a vertically and downwardly offset portion 186 terminating in a horizontal projection 188. This projecting portion 188 is threaded and receives an internally threaded adjustable weight member 190. Adjustment of member 190 horizontally along the threaded portion 188 permits relative adjustment of the parts so that the weight member 190 will balance not only the weight of the platform 158 and its associated parts, but also the cup or receptacle 42 and the desired predetermined quantity of fruit juice.

Thus the weight member 190 is adjusted to a point at which the empty receptacle 42 and supporting platform 158 will be overbalanced and the platform edge 172 will be urged against the upper stop 174. When the receptacle 42 has received the desired quantity of juice, say five ounces, for example, the added weight of the juice will just overbalance the weight member 190 so that the platform edge 172 will move down toward lower stop 176.

Platform 158 is provided with side flanges 192. The horizontal portion of plate 158 is also provided with perforations 193 (Fig. 8) for drainage of any juice which overflows the cup or which is discharged in the absence of a cup. A funnel 194 directly below the perforated portion of plate 158 is connected to a waste hose 196 which carries any such juice to the waste receptacle 84.

Relative rotation of the cup supporting platform 158 is used to control the above described valve means and also certain other portions of the circuit as noted below. For this purpose a switch 198 is carried by bracket 200 beneath the end 172 of platform 158. Bracket 200 is secured to the base plate 182 of the cup delivery and transfer mechanism at 202. Switch 198 is of the type having an actuating member 204 which requires only slight pressure and travel to change the condition of the switch. Member or button 204 is engaged by a lever arm 206 pivoted to the switch casing at 208 and having one end 210 engaging beneath the platform 158. Downward movement of the platform when the predetermined quantity of juice in cup 42 overbalances weight 190 will thus operate switch 198.

In the present case this weight control switch 198 is normally open when the platform 158 is raised, and the switch is closed by depression of plate 158 under the predetermined load. By suitable circuit connections described below, the closing of switch 198 in response to discharge of the desired amount of juice deenergizes the fill solenoid 146 and thus moves the valve member 126 from discharge to closed position as soon as the required amount of juice has been dispensed. The closing of switch 198 also serves through the connections described below to initiate a cup delivery cycle.

*Cup delivery cycle and auxiliary driving means*

The present invention includes certain improvements over the cup delivery and cup transfer means of the Monroe patent. Mounted within the machine is a supply of empty cups for use in dispensing the desired quantity of fruit juice. Preferably, the empty cup supply is carried by one or more empty cup dispensers as indicated at 212 and 214 in Fig. 8. These cup dispensers are of standard form and two of them are used in order to double the number of available cups within a given height of cabinet.

The cup supply means 212 and 214 are provided with operating levers which, when actuated, dispense one cup at a time and permit the cup to fall downwardly by gravity. Cup supply means 212 is operated by an actuating lever 216 pivoted at 218 to a vertical post and bearing member 220 secured at 222 to one of the rear corners of the supporting plate 182. Cup supply means 214 is similarly actuated by a lever 224 pivoted at 226 to another supporting post and bearing member 228 mounted at the opposite rear corner of the plate 182.

Beneath the supply means 212 is a fixed platform 230 supported by posts 232 fastened to main plate 182. Platform 230 is at substantially the same height as the control platform 158 beneath the discharge spout and is designed to furnish a support for an empty cup when the latter is dropped from the supply means 212 and is then pushed laterally to the center of the machine onto plate 158. A similar supporting platform 234 is fixed on supporting post 236 secured to the bottom plate 182 and serves as a support for cups transferred from supply means 214 to the control plate 158.

For the transfer of cups from supply 212, a pusher 238 is provided. This pusher is carried by a rod-like arm 240 having the configuration shown in Fig. 8 and secured at 242 to a movable pusher support 244. Pusher support 244 has a horizontal opening 246 by which the support 244 is slidably mounted on a transversely extending stationary rod 248. The ends of rod 248 are secured in the supporting posts 220 and 228.

Pusher support 244 is provided with another opening 250 for engagement with a cup transfer or drive shaft 252 rotatably mounted in supporting posts 220 and 228. Drive shaft 252 has an interrupted or reverse screw thread 254 engaged by a suitable follower (not shown) in pusher support 244. Rotation of shaft 252 in one direction accordingly causes reciprocation of the pusher support 244 laterally along shaft 248 back and forth from one end to the other of the threaded portion in known manner. The length of this threaded portion is chosen to correspond to the desired extent of movement of the pusher 238 so that during one cup delivery cycle the pusher will transfer a cup from the platform portion 230 immediately below supply means 212 to the exact center of the supporting plate 158 beneath the discharge spout. During the next cycle the pusher will then be retracted to its starting position.

A similar pusher 256 is provided for the transfer of cups from supply means 214 to the control platform 158. Pusher 256 is carried by a suitable rod 258 secured to a similar pusher support 260. Opening 262 in support 260 provides for sliding movement of the pusher support along supporting rod 248, while opening 264 and a follower (not shown) engage the reverse threaded portion 266 of shaft 252. Thus rotation of shaft 252 will reciprocate the pusher support 260 and pusher 256 to retract the pusher during one cycle and to transfer a cup from supply means 214 to the center platform 158 during the next cycle.

Pusher supports 244 and 260 carry projections 265 and 267 respectively for engagement with the actuating levers 216 and 224 to release a cup from the corresponding supply member when the pusher is fully retracted. As shown in Fig. 8, the pusher supports 244 and 260 are so located that they will operate alternately. Thus in one cycle pusher 256 is fully retracted while pusher 238 transfers a cup to the platform 158. In the next cycle of rotation of shaft 252 the pusher 256 will move a cup to the platform 158 while the pusher 238 will be retracted. The use of two cup supplies and two alternately operating pushers thus reduces the total travel required for the cup transfer mechanism in any given cycle of the cup transfer and delivery unit.

According to the invention separate or auxiliary driving means are provided for operation of the parts through a cup delivery and transfer cycle. The auxiliary driving means includes a cup delivery motor 268 having a shaft 269. A gear 270 on this shaft engages a driven gear 272 on cup transfer shaft 252.

For delivery of filled cups from the supporting platform 158 a cup delivery pusher 274 is provided. Pusher 274 is carried by a rod-like member having a rearwardly extending portion 284, a downwardly extending section 286, and a short forwardly extending arm 288. This arm 288 is fixed to a cup delivery pusher support 290 having an opening 292 by which the support is slidably mounted on a rod 294. Rod 294 is carried by brackets 296 at the front and rear of the base plate 182. The support 290 is also provided with a second opening 298 engaging the reverse threads 300 of a cup delivery shaft 302. Rotation of shaft 302 accordingly causes reciprocation of the support 290 in a manner similar to that described above to move the pusher 274 from the retracted position of Fig. 8 to a projected position in which the cup 42 is pushed to the front of the machine. Pusher 274 thus delivers the cup through an opening 276 in the front wall of the machine onto the external supporting platform 278. This platform is perforated and is provided with an overflow chute 280 and a pipe 282 for returning spilled juice to the waste receptacle.

The driving connections for cup delivery shaft 302 include a gear 304 on shaft 302, driven by a gear 306 on auxiliary shaft 308. Shaft 308 is rotatably supported in bearing brackets 310 and 312 at the front of the base plate 182. The other end of shaft 308 carries a gear 314 which is driven by a gear 316 on the end of motor shaft 269 opposite gear 270. The gearing connections are so chosen that cup delivery shaft 302 will be rotated to move the delivery pusher 274 through one complete cycle from retracted to projected and back to retracted positions during the time in which either cup transfer pusher 238 or pusher 256 moves a cup from the supply point to the central control platform 158.

In order to prevent interference with the controlling platform 158 and other parts of the mechanism the opening 276 in the front wall of the machine casing is provided with a door or closure member 317. To open this door at the required time a worm 318 is provided on the end of cup transfer shaft 252. This worm engages a worm gear 320 on a short shaft 322 extending toward the front of the machine and supported in brackets 324 on the base plate 182. A cam 326 is carried at the front end of shaft 322 and has a high portion 328 for opening the door and a low portion 330 for closing the door. These cam portions engage a door operating lever 332 which may be connected to the door at one end and which is pivoted at 334 to one of the frame members 336. The position of cam 326 is so adjusted that the door will open in the first part of the cup delivery cycle by engagement of the high cam portion 328 with lever 332 to permit movement of the cup 42 out through the opening under the control of delivery pusher 274.

As stated above, initiation of a cup delivery cycle and energization of motor 268 will take place in response to movement of the control platform 158 when the predetermined quantity of juice is received by cup 42. The connections by which this result is achieved are described below. The cup delivery mechanism then runs through one complete cycle in which the cup delivery pusher 274 delivers a cup to the front of the machine and one or the other of cup transfer pushers 238 and 256 transfers another empty cup into position on platform 158. At the conclusion of the cycle the delivery pusher 274 is moved back to its retracted position as shown in Fig. 8.

A cup delivery stopping switch 338 is provided to terminate the cup delivery cycle. While switch 338 could be actuated at any convenient portion of the cup delivery mechanism, the switch is shown with its control button 340 operated by a cam or lug 342 on the cup delivery support 290. When the support 290 is fully retracted, as in Fig. 8, the switch button 340 is engaged by cam 342 to open the stopping switch 338 and terminate the cup delivery cycle in the manner described in connection with the circuit details below. When the next cup delivery cycle is initiated upon movement of control platform 158, the initial movement of delivery pusher support 290 moves the lug 342 away from switch button 340 to permit closing of the switch 338 throughout the remainder of the cup delivery cycle. Thus the cup delivery cycle will continue even though the filled cup is removed. Completion of the cycle by full retraction of support 290 then opens the switch to terminate the cycle. The circuit connections for the switch are shown in Fig. 10 and described below.

In order to prevent overrunning of the cup delivery motor 268 and associated mechanism, which might push the next empty cup 42 forwardly away from the discharge spout before it was filled, the motor 269 is provided with a brake member 344. Member 344 is engaged by a brake band 346, one end of which is adjustably anchored at 348 to the bottom plate 182. The brake band then passes up over the brake member 344 and has its other end anchored to a spring 350 secured at 352 to the frame. A brake release lever 354 pivoted to the frame at 356 has one end 358 engaging a portion of the brake band end adjacent the spring 350. The other end 360 of lever 354 is engaged by the core 362 of a cup delivery brake solenoid 364.

When the solenoid 364 is deenergized, spring 350 will hold the brake band 346 in braking engagement with member 344 to prevent further rotation of motor shaft 269 and the various driven shafts of the cup delivery mechanism. When the solenoid 364 is energized, lever 354 is rotated to raise the spring-secured end of the brake band and thus loosen the band to permit rotation of the motor shaft 269. The brake solenoid 364 is connected in the motor circuit so that it will be energized to release the brake whenever the motor is energized. Thus the moment the motor is deenergized the brake band will immediately be tightened by the spring to stop rotation of the parts. In the particular circuit of Fig. 10 the solenoid 364 is connected in parallel with the motor 268.

*Control circuit details*

The wiring diagram of Fig. 10 indicates one way in which the various elements of the machine can be operatively interconnected to perform the functions set forth above in their proper sequence. Since this particular machine is designed for operation on a standard 110 volt 60 cycle A. C. supply, two leads 366 and 368 are provided for connection through the usual plug and socket to such a supply. To simplify the discussion of the circuits they will be discussed in the order in which they are energized, starting with the connection of the leads 366 and 368 to the current supply, the provision of a supply of oranges, and the insertion of a suitable coin or coins in the coin box.

The refrigerator unit is shown as a block at the left portion of the diagram and is connected across the supply leads 366 and 368 at all times. While this refrigerator unit may have its own thermostatic switch (not shown) to interrupt the circuit to the compressor motor from time to time, the unit as a whole remains connected whenever the machine is connected to a current supply. Thus the orange supply and working parts of the machine will be at the desired cold temperature at all times.

The orange detector switch 94 of the supply hopper is connected in series with certain elements of the standard coin box 22 and these series connected elements in turn are connected across the supply leads 366 and 368. The particular coin box illustrated in the diagram includes a coin reject solenoid 370 and coin impulse switches 372 and 374. The coin reject solenoid controls a standard portion of the coin chute in the coin box. Whenever the reject solenoid is deenergized, i. e. when the orange detector switch is open due to the absence of the desired minimum quantity of oranges, the coin chute will return any inserted coins to the operator in known manner. When the orange detector switch is closed and the reject solenoid is energized, the coins which are inserted will be permitted to operate the coin impulse switches.

Switch 372 is connected in series with a totalizer solenoid 376 while switch 374 is connected in series with a totalizer solenoid 378. The impulse switches are designed for operation by different coins. For example, switch 372 may be closed by insertion of a dime while switch 374 is closed by insertion of a nickel. The totalizer solenoids 376 and 378 are connected by a known form of stepping rachet (indicated schematically by dotted lines 380) to the starting switch 382. This starting switch is a double pole switch and includes two normally open switch elements 384 and 386. The manner in which the totalizer solenoids operate the starting switch is well known and may be described briefly as follows. Dime solenoid 376 when energized will move the stepping rachet two notches, while energization of the nickel impulse switch 374 and its totalizer solenoid 378 will move the stepping rachet only one notch. Assuming that the machine is set for operation upon receipt of ten cents, the switches 384 and 386 of the starting switch 382 will be closed whenever the stepping rachet moves two notches, whether this movement be caused by two impulses of solenoid 378 or one impulse of solenoid 376. Starting switch 382, when closed, will remain closed until reopened or reset by means described below.

The closing of the starting switch 382 will complete a circuit across the leads 366 and 368 through the main drive contactor 388 and its energizing coil 390. This contactor is of standard construction and includes three switches 392, 394 and 396, the first two of which are normally open and the third of which is normally closed. When the main drive contactor coil 390 is energized by closing of the starting switch, all three of the contactor switches will be moved to their opposite positions.

The closing of contactor switch 394 will start the main motor of the machine. The closing of switch 392 will complete a circuit through the clutch solenoid 58 and will thus start the main drive cam shaft through its extraction cycle. It will be noted that the circuit through the clutch solenoid is completed through a normally closed contactor switch 402 in the cup delivery contactor 398 described below. Thus the clutch solenoid will be energized to permit repetition of the extraction cycle as long as the main drive contactor switch 392 remains closed and the cup delivery contactor switch 402 also remains closed.

The main drive contactor coil 390 will be energized to hold the various main drive contactor switches in their operated positions as long as the starting switch 382 remains closed, i. e., until operation of the reset means described below. Opening of the starting switch 382 by the reset means will deenergize the main drive contactor solenoid 390 and restore the individual contactor switches 392, 394, and 396 to their normal positions. The coin box, starting switch and main drive contactor all constitute part of the starting means for the particular juice extraction mechanism illustrated.

The stopping means for the machine includes a main stopping switch 98, shown in Fig. 10 as connected in parallel with the starting switch 382. Thus, as already described above, even if the starting switch is opened or reset in the midst of an extraction cycle, the main stopping switch 98 will remain closed until the main drive cam shaft completes the extraction cycle and permits the stopping switch to return to open position.

The third main drive contactor switch 396 controls the operation of the valve timer and the movement of the valve to waste position as described further below.

The control circuit for the cup delivery cycle includes a cup delivery contactor 398 of standard construction including a coil 400 and three contactor switches 402, 404, and 406, the first two of which are normally closed and the third of which is normally open. The cup delivery contactor coil 400 is normally connected in series with its own closed contact switch 404, weighing switch 198 associated with control platform 158, and starting switch 382. Since the weighing switch 198 is initially open when an empty cup is on the platform, the closing of the starting switch 382 will not energize the cup delivery contactor. Therefore its contactor switches 402, 404, and 406 will remain in their normal positions until the predetermined quantity of juice has been dispensed.

In these normal positions, it will be noted that contactor switch 402, which is normally closed, not only completes the circuit through the clutch solenoid 58 as already described, but also completes a parallel circuit from the starting switch through the fill or discharge solenoid 146. Thus the closing of the starting switch 382 in response to insertion of the proper coins also energizes the fill solenoid 146 and moves the valve member 126 to discharge position, so that any juice remaining in the juice reservoir will immediately be discharged into the empty cup. All juice extracted during the cycle will also reach the cup until the predetermined quantity is obtained.

When the quantity for which the control platform 158 has been balanced is reached, the weighing switch 198 will close. It will energize the cup delivery contactor to change the condition of its switches. The opening of contactor switch 402 will deenergize both the clutch solenoid 58 and the fill solenoid 142. Thus the valve member 126 will return to closed position and all further juice extracted during the cycle will be retained in the reservoir. At the same time the deenergization of clutch solenoid 58 will permit the clutch to become disengaged at the end of the extraction cycle which is then taking place, so that the main drive cam shaft will not start through another cycle.

Cup delivery contactor switch 404 will be opened as soon as the contactor coil 400 is energized, but switch 406 will be closed. The switches are so arranged that switch 406 will close before switch 404 opens. As shown by the circuit diagram, the contactor switch 406 will thus establish a holding circuit for coil 400 which bypasses the weighing switch 198 and thus keeps the cup delivery contactor in operated position even though the filled cup is removed from the platform and the weighing switch is again opened in the first part of the cup delivery cycle. This holding circuit will keep the cup delivery contactor energized until both the starting switch 382 and the stopping switch 98 have been opened.

When weighing switch 198 is closed, a circuit is also completed through the cup delivery contactor to a starting switch reset solenoid 408. This solenoid functions as a reset means to open the starting switch 382 so that operation of the main driving mechanism will be terminated as soon thereafter as the main stopping switch opens at the end of the current extraction cycle.

The closing of the weighing switch 198 also initiates the cup delivery cycle by completing a circuit through the starting switch and/or main stopping switch 98 to the cup delivery motor 268 and brake solenoid 364. A branch of this same circuit at the upper right corner of the circuit diagram of Fig. 10 also energizes the cup delivery relay 410 when the weighing switch 198 closes. Energization of this relay 410 establishes a holding circuit for the relay and continues the energization of the cup delivery motor by a circuit through the cup delivery stopping switch 338.

While this stopping switch is shown as normally open in the diagram, it will be understood that as soon as the cup delivery motor starts operation upon closing of weighing switch 198, the cup delivery pusher will start to move the filled cup away from the weighing platform 158 and the very first portion of this movement will close the cup delivery stopping switch 338. Thus the holding circuit for relay 410 and the energizing circuit for cup delivery motor 268 and brake solenoid 364 will be maintained for the remainder of the complete cup delivery cycle until the delivery pusher is fully retracted and the cup delivery stopping switch 338 is thereby opened to terminate the cycle.

The final portion of the control circuit to be described includes the valve timer 412 which is under the control of main drive contactor switch 396. As shown in Fig. 10 this timer includes a timer motor 414 which rotates a control arm 416 through a clutch connection 418. Clutch 418 is controlled by a clutch solenoid 420 and is so arranged that the clutch will be in driving engagement only when solenoid 420 is energized. Since both the timer motor 414 and clutch solenoid 420 are connected across the supply leads 366 and 368 through the main drive contactor switch 396, the timer will function only when the main drive contactor is in its normal or rest position, i. e., when the extraction cycle has been terminated.

When the timer solenoid 420 is energized and clutch 418 is thus engaged, the motor 414 will drive control arm 416 in the direction of the arrow against the resilience of return spring 422. At the end of a predetermined travel, control arm 416 will engage a switch control lever 424 which is provided with suitable stops and with an over-center spring 426. Control arm 416 will thus force the switch lever 424 from the position shown in the circuit diagram in a clockwise direction until the overcenter spring snaps it to its other position to change the condition of switches 428 and 430. The normally open switch 428 is connected in series with the waste solenoid 148 and main drive contactor 396 across the supply leads 366 and 368. Thus the waste solenoid 148 will be energized to move its valve member 126 to waste position when control arm 416 reaches the point where lever 424 is snapped to its operated position.

This movement of the lever will also open the normally closed switch 430 which completes the circuit through the timer solenoid 420. Thus the solenoid will be deenergized, the clutch 418 will be disengaged, and the return spring 422 will restore the control arm 416 to its starting position. During such restoration the control arm 416 engages another portion of the lever 424 and snaps the lever back to its starting position. This will reclose the switch 430 and again establish the clutch connection 418 to repeat the cycle at predetermined intervals.

The connection of the motor 414 to the control arm 416 is achieved through suitable gearing so that a predetermined time interval will be required for the movement of the control arm 416 from the starting position of Fig. 10 to the point at which switch lever 424 will be operated. The time interval will be set to correspond to the period in which the extracted juice remains fresh and tasty. For example, a five-minute interval might be used. This time interval can be adjusted by changing the location of the stops to vary the length of the path through which the control arm 416 must move.

Thus the valve timer functions, whenever the main drive contact 396 is closed. It will operate the waste solenoid and dump the juice from the juice reservoir at the end of a predetermined time interval after termination of the preceding extraction cycle. It will be understood that termination of the cycle closes the switch 396 and energizes the valve timer 412. If the machine is again operated prior to the end of the predetermined interval, the main drive contactor switch 396 will be opened and this will deenergize the timer solenoid 420 so that the timer parts will be reset to their original position. Thus the waste solenoid will not be energized during the extraction cycle and will only be operated if the cycle has terminated, the contactor switch 396 has been thereby closed, and the required time interval has elapsed thereafter without another operation of the starting means.

While a specific form of valve timing mechanism has been illustrated, it will be understood that timers of this general type are available as standard commercial items of manufacture and that any standard timing mechanism can be used in the present machine provided it operates the waste solenoid 144 in the manner and in the sequence specified.

According to the foregoing description a fruit juice machine has been provided which accomplishes the objects set forth at the beginning of this specification and which makes possible more efficient and more economical operation in the juice extraction field. The machine offers great savings in operation over a machine which juices the same number of fruit specimens at each operation, because such a prior machine must be set to juice more oranges than would be required for the minimum quantity of desired juice. The present machine, on the other hand, supplies exactly the desired amount of juice to each customer and salvages the extra juice extracted from the last fruit specimen, whenever the machine is again operated within the period of time in which the juice remains fresh and tasty.

The control circuits and operating mechanisms described herein are illustrative of a preferred form of the invention. Obviously these elements are subject to reasonable modification within the limits of the objectives set forth and of the manner and sequence of operation specified.

Since many such variations and changes in the exact details of construction will be readily apparent to persons skilled in this field, it is intended that this invention shall cover all such changes and modifications as fall within the spirit and scope of the attached claims.

Now, therefore, we claim:

1. In a fruit juice extracting and dispensing machine having cyclically operable means for extraction of juice from a predetermined number of fresh fruit specmiens at each extraction cycle of the machine, and a discharge spout through which the extracted juice is fed to a cup, the improvement comprising a juice collecting reservoir between said extraction means and said discharge spout, valve means between the reservoir and discharge spout movable between at least a discharge position in which all remaining juice in the reservoir is fed through said discharge spout and a closed position in which excess freshly extracted juice from the current extraction cycle is at least temporarily retained in the reservoir, valve control means responsive to the quantity of juice passing through said discharge spout to said cup, said valve control means being operatively connected to said valve means and actuating the latter to closed position in response to discharge of a predetermined quantity of juice, and means including the relative sizes of said predetermined quantity and of the amount of juice available from said predetermined number of fruit specimens insuring the retention in said reservoir of less than said predetermined quantity of juice between successive operations of the machine and also insuring the discharge of all the retained juice no later than during the next dispensing operation of the machine.

2. A fruit juice machine according to claim 1 having stopping means for terminating operation of the extraction means at the end of a cycle, said stopping means being operatively connected to operate in timed sequence and automatically terminate said operation only after the valve means has been moved to closed position.

3. In a fruit juice extracting and dispensing machine having cyclically operable means for extraction of juice from a predetermined number of fresh fruit specimens at each extraction cycle of the machine, and a discharge spout through which the extracted juice is fed to a cup, the improvement comprising a juice collecting reservoir between said extraction means and said discharge spout, valve means between the reservoir and discharge spout movable between at least a discharge position in which all remaining juice in the reservoir is fed through said discharge spout and a closed position in which excess freshly extracted juice from the current extraction cycle is at least temporarily retained in the reservoir, valve control means responsive to the quantity of juice passing through said discharge spout to said cup, said valve control means being operatively connected to said valve means and actuating the latter to closed position in response to discharge of a predetermined quantity of juice, starting means movable between an off position and a starting position in which an extraction cycle is initiated, said starting means remaining in starting position when moved thereto and thereby repeating the extraction cycle until the starting means is reset to "off" position, and reset means operatively connected to the starting means and to one of said valve means and valve control means and moving the starting means to "off" position whenever said valve is moved to closed position.

4. A fruit juice machine according to claim 3 having stopping means for terminating operation of the extraction means only at the end of any cycle in which the starting means is in "off" position, said stopping means, starting means and reset means being operatively interconnected for termination of such operation only at the end of the particular cycle in which the starting means is reset to "off" position.

5. In a fruit juice machine having cyclically operating means for extraction of juice from a predetermined number of fruit specimens at each cycle of the machine, and a discharge spout for the extracted juice, the improvement comprising a juice collecting reservoir between said extraction means and said discharge spout, and valve means controlling the flow of juice from reservoir to spout and movable between at least a discharge position providing a passage from reservoir to spout and a closed position blocking such passage, said valve means being moved from discharge to closed position in response to the discharge of a predetermined quantity of juice, and said valve means being moved to discharge position each time said extraction means is started.

6. In a fruit juice machine having cyclically operating means for extraction of juice from a predetermined number of fruit specimens at each cycle of the machine, and a discharge spout for the extracted juice, the improvement comprising a juice collecting reservoir between said extraction means and said discharge spout, and valve means controlling the flow of juice from reservoir to spout and movable between at least a discharge position providing a passage from reservoir to spout and a closed position blocking such passage, said valve means being moved from discharge to closed position in response to the discharge of a predetermined quantity of juice, and a waste outlet, said valve means having in addition to said discharge and closed positions a waste position in which a passage is provided from the reservoir to the waste outlet, and time delay means operatively controlling said valve means and moving the latter from closed to waste position at the end of a predetermined time interval after said valve means has been moved from discharge to closed position.

7. A fruit juice machine according to claim 6 having starting means movable between an off position and a starting position in which an extraction cycle is initiated, said valve means being moved to discharge position in response to initiation of the cycle.

8. In a fruit juice machine having cyclically operable means for extraction of juice from a predetermined number of fruit specimens at each cycle of the machine, and a discharge spout for the extracted juice, the improvement comprising a juice collecting reservoir between said extraction means and said discharge spout, a waste outlet, valve means controlling the flow of juice from the reservoir and having an off position in which juice is retained in the reservoir, a discharge position in which a juice passage is provided from reservoir to spout, and a waste position in which a juice passage is provided from reservoir to waste outlet, means automatically moving the valve means to discharge position at the start of an extraction operation, means automatically moving the valve means to off position by the end of a given extraction cycle in response to discharge of a predetermined quantity of juice, time delay means automatically moving the valve means to waste position at the end of a predetermined time interval after the extraction operation is terminated, and means rendering said time delay means inoperative whenever another extraction operation is initiated within said predetermined interval.

9. In a fruit juice machine having fruit supply means, extraction means, a discharge spout, main driving means operatively connected to the fruit supply and extraction means and operable through an extraction cycle for extraction of juice from a predetermined number of fruit specimens at each cycle of the main driving means, cup delivery means movable between a retracted inoperative position and a delivery position in which a filled cup is moved away from the spout, an empty cup supply, and cup transfer means for moving an empty cup from the cup supply to the spout, the improvement comprising auxiliary driving means operatively connected to the cup delivery means and cup transfer means and operable independently of said main driving means through a cup delivery cycle for first moving a filled cup away from the spout and then moving an empty cup from the supply to the spout, and means operatively controlling the main driving means and auxiliary driving means and energizing the main driving means and thereby repeating said extraction cycle until said cup delivery cycle is initiated.

10. In a fruit juice machine having fruit supply means, extraction means, a discharge spout, main driving means operatively connected to the fruit supply and extraction means and operable through an extraction cycle for extraction of juice from a predetermined number of fruit specimens at each cycle of the main driving means, cup delivery means movable between a retracted inoperative position and a delivery position in which a filled cup is moved away from the spout, an empty cup supply, and cup transfer means for moving an empty cup from the cup supply to the spout, the improvement comprising auxiliary driving means operatively connected to the cup delivery means and cup transfer means and operable through a cup delivery cycle for first moving a filled cup away from the spout and then moving an empty cup from the supply to the spout, starting means operatively connected to the main driving means for initiating the extraction cycle, first control means responsive to discharge of a predetermined quantity of juice and operatively connected to control the auxiliary driving means for initiating a cup delivery cycle after said quantity is discharged, and second control means for the main driving means effectively energizing the latter and repeating the extraction cycle until the cup delivery cycle is initiated, initiation of the cup delivering cycle then causing operation of said second control means to de-energize the main driving means at the termination of the then-current extraction cycle.

11. A fruit juice machine according to claim 10 having a juice collecting reservoir between the extraction means and discharge spout, a valve between the reservoir and spout, the valve being movable between a closed position in which extracted juice is retained in the reservoir and a discharge position in which a juice passage is provided from reservoir to spout, and means for moving the valve from discharge to closed position when the first control means initiates the cup delivery cycle.

12. A fruit juice machine according to claim 11 having means for moving the valve to discharge position when the starting means initiates the extraction cycle.

13. A fruit juice machine having means for extraction of juice from fruit specimens, a reservoir in which the extracted juice is received, and means for discharging juice from the reservoir into a consumer receptacle, the reservoir having a waste outlet, and valve means automatically opening the waste outlet to empty the reservoir at predetermined time periods when said extraction means is inactive.

14. A fruit juice machine according to claim 13 in which the discharging means includes means responsive to discharge of a predetermined quantity of juice for retaining all excess juice in the reservoir after said quantity is discharged.

15. A fruit juice machine having means for extraction of juice from whole fresh fruit specimens, means for discharging freshly extracted juice to a consumer receptacle at each operation of the machine by a user, a juice reservoir, means responsive to discharge of a predetermined quantity of juice for at least temporarily retaining in said reservoir any extracted juice in excess of said quantity, and means operable on the next operation of the machine by a user for discharging to a consumer receptacle all juice then remaining in the reservoir.

16. A fruit juice machine having means for extraction of juice from fruit specimens, means for discharging extracted juice to a consumer receptacle, a juice reservoir, and means responsive to discharge of a predetermined quantity of juice for at least temporarily retaining in said reservoir any extracted juice in excess of said quantity, the reservoir having a waste outlet, and time-controlled valve means opening the waste outlet in response to a predetermined period of inactivity of the extraction means.

17. A fruit juice machine having means for extraction of juice from fruit specimens, means for discharging extracted juice to a consumer receptacle, a juice reservoir, and means responsive to discharge of a predetermined quantity of juice for at least temporarily retaining in said reservoir any extracted juice in excess of said quantity, and time-controlled means for emptying the juice reservoir in response to a predetermined period of inactivity of the extraction means.

18. A fruit juice machine having means for extraction of juice from whole fresh fruit specimens in an extraction cycle, means for discharging freshly extracted juice to a consumer receptacle at each operation of the machine, a juice reservoir, means for retaining at least temporarily in said reservoir any remaining juice after a predetermined quantity of extracted juice has been discharged in a given extraction cycle, and means operable to discharge all retained juice from said reservoir no later than during the next operation of said machine.

19. A fruit juice machine having in combination means for extraction of whole fresh juice from a predetermined number of fruit specimens at each operation of the machine, means for discharging to a consumer receptacle a predetermined quantity which is less than the total amount of juice extracted in a given operation, a waste outlet, and means emptying through the waste outlet the remaining juice extracted during the operation.

20. A fruit juice machine according to claim 19 having means keeping the emptying means ineffective for a predetermined time interval after said predetermined quantity is discharged.

21. A fruit juice machine having in combination means for automatic extraction of juice from a predetermined number of fresh fruit specimens at each operation of the machine by a user, means for automatically discharging to a consumer receptacle a predetermined quantity of juice which is less than the total amount of juice extracted in a given operation, and means for retaining the remaining extracted juice and discharging all of it to a consumer receptacle at the next operation of the machine.

22. A fruit juice machine having in combination means for automatic extraction of juice from a predetermined number of fresh fruit specimens at each operation of the machine by a user, means for automatically discharging to a consumer receptacle a predetermined quantity of juice which is less than the total amount of juice extracted in a given operation, reservoir means automatically retaining at least temporarily the remaining juice extracted during the given operation, and means including the relative sizes of said predetermined quantity and of the amount of juice available from said predetermined number of fruit specimens insuring the retention in said reservoir of less than said predetermined quantity of juice between successive operations of the machine and also insuring the discharge of all the retained juice no later than during the next dispensing operation of the machine.

23. A fruit juice machine according to claim 22 having means automatically discharging from the reservoir means to a consumer receptacle in a subsequent operation all the remaining juice retained from a preceding operation.

24. A fruit juice machine having in combination means for automatic extraction of juice from a predetermined number of fresh fruit specimens at each operation, means for automatically discharging to a consumer receptacle a predetermined quantity of juice which is less than the total amount of juice extracted in a given operation, reservoir means automatically retaining at least temporarily the remaining juice extracted during the given operation, means automatically discharging from the reservoir means to a consumer receptacle in a subsequent operation the remaining juice retained from a preceding operation, and time-controlled waste means automatically dumping the juice from the reservoir to a waste outlet whenever a subsequent operation is not initiated within a predetermined time interval after the preceding operation.

25. A fruit juice machine having extraction means including a reamer, a housing surrounding the reamer and located to receive extracted juice directly from the reamer and refrigerating means conductively associated with said housing and thereby chilling the housing and the freshly extracted juice.

26. A fruit juice machine having extraction means including a reamer, a discharge spout, housing means across which the extracted juice flows from reamer to spout, and refrigerating means conductively associated with said housing means and thereby chilling the freshly extracted juice as it flows to the spout.

27. In a fruit juice machine having fruit supply means, extraction means, a discharge spout, main driving means operatively connected to the fruit supply and extraction means and operable through an extraction cycle for extraction of juice from a predetermined number of fruit specimens at each cycle of the main driving means, cup delivery means movable between a retracted inoperative position and a delivery position in which a filled cup is moved away from the spout, and empty cup supply means, the improvement comprising in combination auxiliary driving means operatively connected to the cup delivery means and cup supply means and operable through a cup delivery cycle in which the cup delivery means moves a filled cup away from the spout and returns to retracted position and in which the cup supply means positions another empty cup at the spout, manually operable main starting means operatively connected to control the main driving means for initiating an extraction cycle, and cup delivery starting means operatively connected to control the auxiliary driving means and automatically responsive to the discharge of a predetermined quantity of juice for initiating a cup delivery cycle.

28. A fruit juice machine according to claim 27 having main stopping means operatively connected to terminate operation of the main driving means only at the end of each complete extraction cycle, and control means rendering the main stopping means ineffective (and thereby continuing the operation of the main driving means to repeat the extraction cycle) until the cup delivery cycle is initiated.

29. A fruit juice machine according to claim 27 having a juice reservoir and means for retaining in said reservoir any extracted juice in excess of said predetermined quantity, said retained juice including only the juice extracted between the start of the cup delivery cycle and the end of the current extraction cycle.

30. A fruit juice machine according to claim 29 having valve means for the reservoir operatively connected to discharge all the retained juice from a preceding operation into the cup to be filled during a subsequent operation.

31. In a fruit juice extracting machine having a pusher for engaging and moving a cup along a predetermined path, the improvement comprising a reciprocating support member for the pusher, a rotatable shaft extending parallel to said path, and reverse threads on a portion of the shaft corresponding to the desired distance of pusher reciprocation, the support member being slidably mounted on the shaft and engaging said threads for reciprocation of the pusher in response to rotation of the shaft.

32. A fruit juice machine comprising cyclically operable means for extraction of juice from a predetermined number of whole fresh fruit specimens at each cycle of the extraction means, a discharge spout through which freshly extracted juice is fed to a cup at each operation of the machine, a juice-collecting reservoir, valve means operatively associated with said discharge spout and reservoir and movable between at least a discharge position in which the juice from said extraction means and all remaining juice in said reservoir pass through the discharge spout to said cup and a closed position in which juice from said extraction means is retained in said reservoir, starting means operable by a user from an off position to a starting position, said starting means being operatively connected to both said cyclically operable extraction means and said valve means and thereby starting operation of the extraction means for at least one cycle and also causing movement of the valve means to discharge position whenever the starting means is moved to starting position, and valve control means responsive to the passage of a predetermined quantity of juice through said discharge spout to said cup, said valve control means being operatively connected to said valve means and thereby actuating the latter to closed position in response to discharge of said predetermined quantity of juice.

References Cited in the file of this patent

UNITED STATES PATENTS

| | | |
|---|---|---|
| 2,000,556 | Brady | May 7, 1935 |
| 2,176,377 | Gamble | Oct. 17, 1939 |
| 2,274,020 | Weightman | Feb. 24, 1942 |
| 2,317,006 | Weightman et al. | Apr. 20, 1943 |
| 2,365,832 | Monroe | Dec. 26, 1944 |
| 2,569,486 | Mills | Oct. 2, 1951 |
| 2,591,507 | Brous | Apr. 1, 1952 |
| 2,609,982 | Johnson | Sept. 9, 1952 |

U. S. DEPARTMENT OF COMMERCE
PATENT OFFICE
CERTIFICATE OF CORRECTION

Patent No. 2,817,935                                      December 31, 1957

Paul E. Fischer et al.

It is hereby certified that error appears in the printed specification of the above numbered patent requiring correction and that the said Letters Patent should read as corrected below.

Column 2, lines 67 and 68, for "repretition" read -- repetition --; column 15, line 29, for "specmiens" read -- specimens --; column 16, line 10, after "valve" insert -- means --; column 18, line 42, strike out "whole fresh" and insert the same before "fruit" in line 43, same column.

Signed and sealed this 25th day of February 1958.

(SEAL)
Attest:

KARL H. AXLINE                                      ROBERT C. WATSON
Attesting Officer                                 Commissioner of Patents